United States Patent [19]

Lesche et al.

[11] Patent Number: 4,514,798
[45] Date of Patent: Apr. 30, 1985

[54] ELECTRICAL CONTROL APPARATUS

[75] Inventors: Wolfgang Lesche; Volker Rindfleisch, both of Berlin, Fed. Rep. of Germany

[73] Assignee: Siemens Aktiengesellschaft, Berlin and Munich, Fed. Rep. of Germany

[21] Appl. No.: 393,297

[22] Filed: Jun. 29, 1982

[30] Foreign Application Priority Data

Jun. 30, 1981 [DE] Fed. Rep. of Germany ....... 3125779
Apr. 26, 1982 [DE] Fed. Rep. of Germany ....... 3216286

[51] Int. Cl.$^3$ ........................ G05B 11/01; G05B 11/36
[52] U.S. Cl. ..................................... 364/188; 364/140; 364/146
[58] Field of Search ............... 364/188, 189, 140, 141, 364/146, 147; 116/DIG. 37, 46

[56] References Cited

U.S. PATENT DOCUMENTS 2,777,024  1/1957  West ............................. 200/50 AA
3,655,926  4/1972  Meermans ........................ 200/50 A
4,004,113  1/1977  Ericson et al. ................. 200/50 AA
4,180,860 12/1979  Driscoll et al. ................ 364/188 X
4,189,765  2/1980  Kotalik et al. .................... 364/188

OTHER PUBLICATIONS

Operator/Process Communication and Monitoring with the Teleperm M System; Bussmann et al., *Siemans Power Engineering*, (1979), No. 8, pp. 257-260.
"Displays and Annunciators Acquire Color and Intelligence to Keep Pace with Electronic Control", Timothy Miller, Control Engineering, Oct. 1981, pp. 111-114.
Barber Colman Company instruction manual, dated Sep. 1979 for "1253 IN 100-3 560 Series Microprocessor Controller For Process Heating Applications".

*Primary Examiner*—Joseph F. Ruggiero
*Assistant Examiner*—Allen MacDonald
*Attorney, Agent, or Firm*—Kenyon & Kenyon

[57] ABSTRACT

Disclosed is a control apparatus having an indicator and a control which are used to display and change two different types of parameters in two modes of operation of the apparatus. The apparatus includes a control panel and a movable panel which can be moved to alternately overlay and expose at least a portion of the control panel. Switch means are provided to condition the apparatus to operate in a first mode in which the indicator displays a first type of parameter and the control selects or adjusts the value of the first parameter while the apparatus is automatically prevented from operating in a second mode of operation. The switch means further conditions the apparatus to operate in the second mode in which the indicator displays a second type of parameter and the control selects or adjusts the value of the second parameter while the apparatus is automatically prevented from operating in the first mode.

5 Claims, 4 Drawing Figures

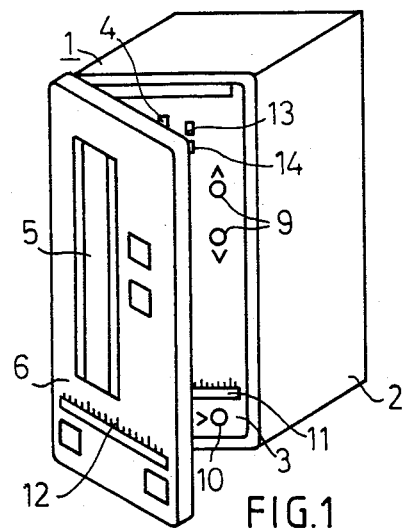
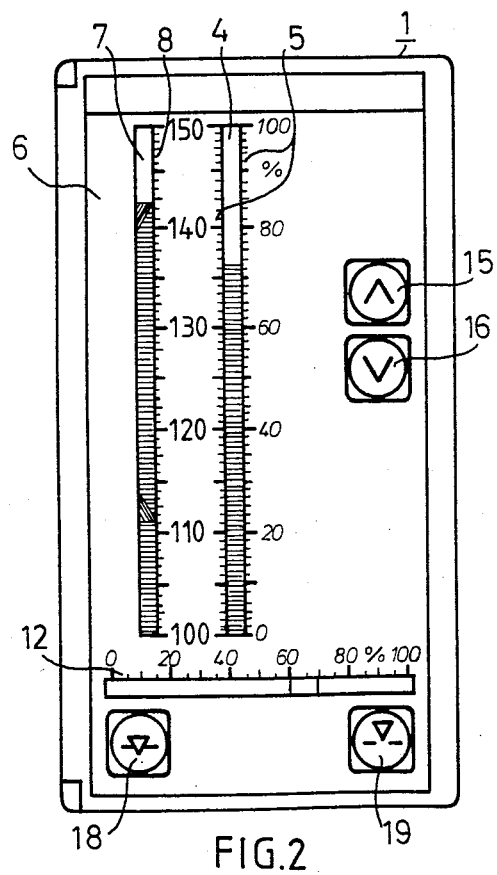
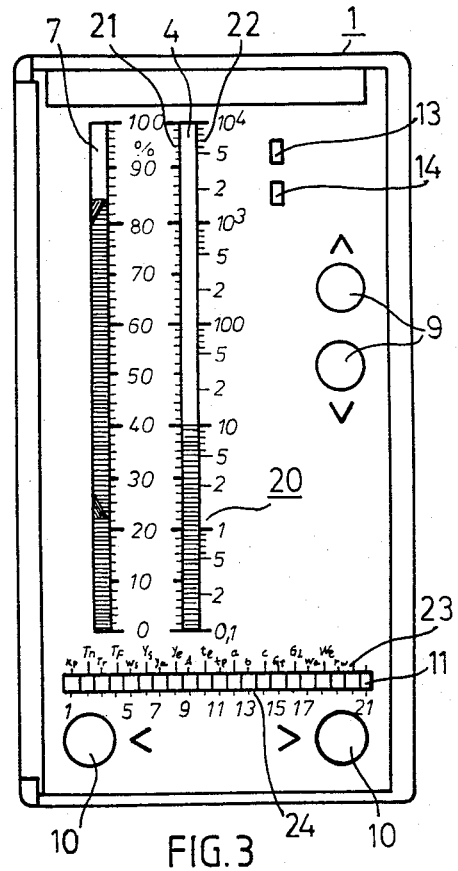

1

ELECTRICAL CONTROL APPARATUS

BACKGROUND OF THE INVENTION

The present invention relates to an electrical control apparatus which includes means for setting and indicating two types of parameters such as process and control parameters in which a common indicating means and a common control are utilized for displaying and setting the two different types of parameters.

A prior art control apparatus is described in the Barber Colman Company instruction manual dated September 1979 for "1253 IN 100-3 560 Series Microprocessor Controller For Process Heating Applications." As described in the instruction manual, the controller displays the actual value of a process parameter or variable (e.g. voltage or current corresponding to a measured temperature) and provides a controlled output which is related to the process parameter by the control function of the controller. A common indicator and a common control on the control panel are used to display and set the process parameter and also a control parameter (e.g. a tuning constant) in different operating modes of the apparatus. The value of the process parameter can be set as a limit value or an alarm value, etc., relative to the actual monitored or controlled value of the process parameter. The control panel includes an access door which can be swung open to expose a mode control switch for switching the apparatus from a normal control mode of operation to a set-up mode of operation. Upon actuation, the mode control switch conditions the apparatus to operate in the set-up mode in which a control parameter is displayed and can be set. The value of a selected control parameter can be set by operating the common control on the control panel which incrementally changes the value and indication of the selected control parameter when the apparatus is in the set-up mode. The common control can also be used to set a value of a process parameter when the apparatus is in the normal control mode of operation with the access door swung closed to cover the mode control switch. The apparatus can however also be operated in the normal mode with the access door swung open and even after the mode control switch has been actuated depending on the state of a sequence involving actuation of the mode control switch. It is therefore possible to operate the apparatus in either operating mode with the access door swung open and this can lead to the inadvertent setting or changing of the wrong parameter.

OBJECTS AND SUMMARY OF THE INVENTION

It is an object of the present invention to provide an electrical control apparatus of the type described above in which errors of the above described type are to a large extent precluded. It is a further object of the present invention to provide such an apparatus with an improved control panel layout.

In accordance with the invention, in control apparatus of the above described type having a control panel and a movable panel which can be moved to alternately overlay and expose at least a portion of the control panel, switch means are provided which operate in cooperation with the movable panel for conditioning the apparatus to operate in a first mode (e.g. set-up mode) while preventing operation of the apparatus in a second mode (e.g. control mode) when the movable panel overlays said portion of the control panel, and for conditioning the apparatus to operate in the second mode while preventing operation of the apparatus in the first mode when the movable panel exposes said portion of the control panel. The control panel of the electrical control apparatus includes a first common indicator and a first common control associated with the first common indicator which commonly indicate and set the two types of parameters in the two modes of operation of the apparatus. The switch means conditions the apparatus so that the first common indicator indicates a first type of parameter and the first common control selects or adjusts the value of the first type of parameter indicated by the first common indicator in the first mode, and the switch means conditions the apparatus so that the first common indicator indicates a second type of parameter and the first common control selects or adjusts the value of the second type of parameter indicated by the first common indicator in the second mode. One scale is provided adjacent the first common indicator in the first mode and another scale is provided adjacent the first common indicator in the second mode with only the proper scale being visible in either mode of operation.

In the disclosed embodiment, the one scale is disposed on the control panel and the other scale is disposed on the movable panel adjacent an aperture in the movable panel through which the first common indicator is visible when the movable panel overlays said portion of the control panel.

The apparatus further includes processor means for controlling operations of the aparatus, and means for addressing elements of the apparatus including the processor means, the first common control and the first common indicator in response to said switch means to condition the apparatus to operate in the first and second modes.

In the disclosed embodiment, the first mode is a set-up mode in which the value of a control parameter such as a control constant can be set and the second mode is a control mode in which a process parameter such as a voltage or current corresponding to, for example, a measured temperature can be monitored and set. For example, a value of the process parameter can be set as a limiting value or as an alarm value, etc., relative to the actual monitored value of the process parameter.

In accordance with an aspect of the invention, the apparatus includes a second common indicator and a second common control disposed on the control panel. Similar to the first common indicator, the second common indicator indicates two types of parameters which can be selected or set in two different modes of operation, and the second common control, similar to the first common control, selects or sets the parameter indicated by the second common indicator in the two modes of operation of the apparatus.

In the disclosed embodiment, the second common indicator in cooperation with a scale disposed on the control panel adjacent the second common indicator indicates the identity of the control parameter being indicated by the first common indicator in the first mode when the movable panel exposes said portion of the control panel. The movable panel includes a second aperture and another scale disposed adjacent the second aperture, the second common indicator being visible through the second aperture when the movable panel overlays the control panel. Only the proper one of these two scales is visible in either mode of operation of the apparatus. In the second or control mode of operation, the second common indicator in cooperation with the scale on the movable panel indicates the control function in which the apparatus is operating when in a manual control mode of operation. In this mode, the second common control can be used to manually select particular control functions. Further switch means are provided to select the manual control mode or the automatic control mode of operation.

The apparatus can also include a third indicator disposed on the control panel. In the disclosed embodiments, the first common indicator in the second or control mode indicates a process parameter value which has or is to be set while the third indicator indicates in cooperation with a scale the actual value of the process parameter being monitored or controlled. The movable panel can include a third aperture with the scale disposed adjacent thereto so that the third indicator is visible through the aperture when the movable panel overlays said portion of the control panel.

The electrical control apparatus according to the invention has the advantage over prior art apparatus that, with the movable panel overlaying said portion of the control panel, only values of the process parameter being monitored or controlled can be set or changed using the first common control, and with the movable panel exposing said portion of the control panel, only values of the selected control parameter can be set or changed using the same first common control. Improper operation, for example, an unintentional change of the process parameter, cannot occur when the movable panel exposes the control panel in the first or set-up mode because a change of the process parameter is impossible due to the switch means. It is a further advantage of the control apparatus according to the invention that the second common control can be used in the same modes as the first common control to manually set further parameters in cooperation with the second common indicator.

In the electrical control apparatus according to the invention, quasi-analog devices can be used as indicators such as for example an indicating device comprising a row of adjacently disposed optical indicating elements which can be individually addressed so as to provide a bar segment display or a pointer display.

In accordance with another aspect of the invention, the operational structure of the apparatus can be changed in a third mode of operation of the apparatus. Further switch means are provided on the control panel for conditioning the apparatus to operate in the third mode. In the third mode, the operational structure selected is indicated by the second common indicator in cooperation with a further scale disposed adjacent to the second common indicator on the control panel. The further switch means is preferably disposed so that it can only be actuated when the movable panel exposes said portion of the control panel.

The above and other objects, features, aspects and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which:

FIG. 1 is a perspective view of the control panel subassembly of an embodiment of control apparatus according to the invention depicting the control panel and a movable panel hinged thereto;

FIG. 2 is a front view of the movable panel of FIG. 1 hinged closed and overlaying the control panel.

FIG. 3 is a front view of the control panel of FIG. 1 with the movable panel removed.

DESCRIPTION OF THE PREFERRED EMBODIMENTS

Figure 4:
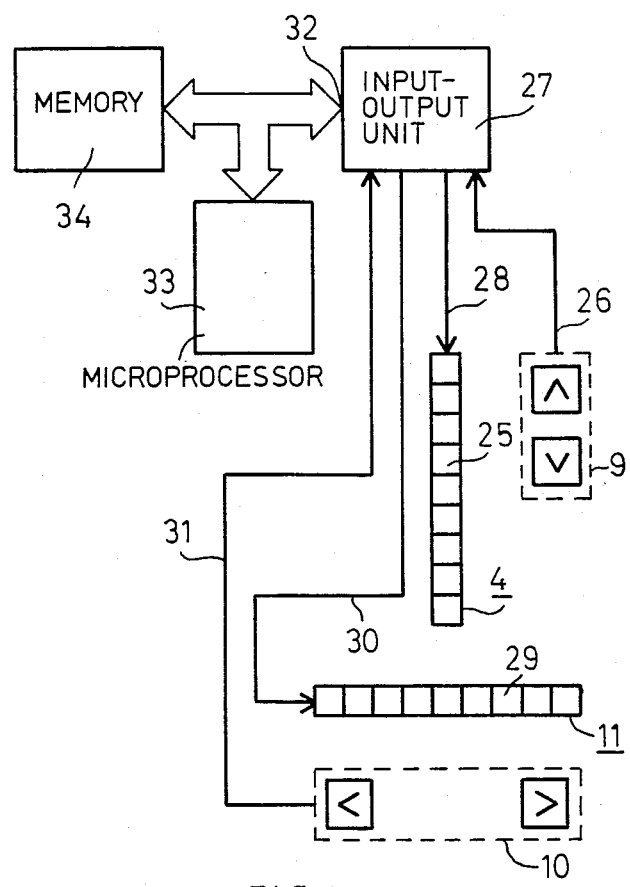
FIG. 4 is a block circuit diagram illustrating coupling of elements of the control panel of FIG. 1 in the apparatus.

FIG. 1 depicts the control panel subassembly 1 of an electrical control apparatus which includes a microprocessor. The electrical control apparatus can provide a controlled output which is related to a monitored process parameter according to the control function of the apparatus. The control panel subassembly 1 includes a housing 2, a control panel 3 and a movable panel 6. The movable panel 6 is hinged to the housing 1 and can be moved into a closed configuration overlaying the control panel so that the indicators and controls depicted in FIG. 2 are exposed and into an open configuration so that the indicator and controls depicted in FIG. 3 are exposed.

Referring to FIGS. 1 and 3, on the control panel 3 are disposed indicators 4, 7 and 11, controls 9, controls 10 and double-throw switches 13 and 14. Controls 9, inter alia, operate the indicator 4 and controls 10, inter alia, operate the indicator 11. A scale referenced generally by 20 and associated with indicators 4 and 7 is applied to the control panel 3 and comprises a scale 22 associated with and disposed along the right side of indicator 4 and a scale 21 associated with indicators 4 and 7 and disposed on the left side of indicator 4 and on the right side of indicator 7 with the numerical indicia for scale 21 disposed between indicators 4 and 7. Associated with indicator 11 are scale 23 disposed above indicator 11 and scale 24 disposed below indicator 11.

The indicator 4 can comprise a number of adjacently disposed optical indicating elements 25 (FIG. 4) and the indicator 11 can comprise a number of optical indicating elements 29. The indicator 7 can similarly comprise a number of optical indicating elements. The indicators 4 and 7 are operated to provide a bar segment type display while the indicator 11 is operated to provide a pointer type display.

Referring now to FIG. 2, which depicts the movable panel in the closed configuration, a scale 5 is disposed adjacent an elongated aperture which frames indicator 4, a scale 8 is disposed adjacent an elongated aperture which frames indicator 7, and a scale 12 is disposed above an elongated aperture which frames indicator 11. Controls 15 and 16 are pushbuttons disposed in the movable panel 6 such that in the closed configuration of the movable panel they overlay and can actuate a respective control element 9 in the control panel 3. Controls 18 and 19 are push buttons disposed in the movable panel 6 such that in the closed configuration of the movable panel they overlay and can actuate a respective control element 10 in the control panel 3.

Double-throw switch 13 is actuated when the movable panel 6 is in the closed configuration of FIG. 2. In that configuration, the control panel subassembly 1 conditions the apparatus to operate in a normal control mode of the apparatus in which process parameters, (e.g. current or voltage signals corresponding to a measured temperature) can be controlled by the apparatus according to the apparatus control function and are displayed, and values such as limit or alarm values can be set.

When the movable panel is in the open configuration of FIG. 3, the double-throw switch 13 is not actuated and the control panel conditions the apparatus to operate in either the set-up mode in which control parameters (e.g. control constants) are displayed and the value thereof can be set, or the structure mode in which the structural configuration of the apparatus is displayed and can be set. Selection between the set-up mode and the structure mode is determined by the double-throw switch 14 which when actuated selects the structure mode.

When the movable panel is in its open configuration, i.e. switch 13 is not actuated (FIG. 3), indicator 4 in cooperation with scales 21 and 22 displays the desired or set value of the control parameter selected; indicator 11 in cooperation with scale 23 identifies the respective control parameter selected for display and change; and scale 24 associated with indicator 11 when double-throw switch 14 is actuated, identifies the structural configuration selected.

Still referring to FIG. 3, the controls 9 operate the indicator 4 in the open configuration of the movable panel. Controls 9 are used to incrementally change the desired or set value of the control parameter displayed by indicator 4. The upper control 9 increases the displayed value while the lower control decreases the displayed value. The controls 10 operate the indicator 11 and can be used to move the pointer indication. The right hand control moves the pointer to the right while the left hand control moves the pointer to the left.

Referring now to FIG. 2, in the hinged closed configuration of the movable panel in which the switch 13 is actuated, indicator 7 in association with scale 8 displays the actual value of a selected process parameter being monitored or controlled by the apparatus while indicator 4 in association with scale 5 displays the set value of the process parameter. Buttons 15 and 16 are provided with markings which indicate the direction in which the set value of the process parameter can be changed on indicator 4. Thus, operating the upper button 15 increases the set value of the process parameter displayed on indicator 4 while the lower button 16 decreases the set value.

Indicator 11 in cooperation with scale 12 is active in a manual control mode of operation and displays the control function manually set in by the buttons 18 and 19. A switch (not shown) is used to condition the apparatus for manual or automatic control operation. In the automatic mode, the control function is automatically determined by the apparatus while in the manual mode the control function can be set manually. Buttons 18 and 19 are provided with markings to identify the direction in which a button moves the "pointer" displayed by indicator 11.

Referring now to the block diagram shown in FIG. 4, the electrical control apparatus includes a microprocessor 33, a memory 34 and an input/output device 27. The optical elements 25 of indicator 4 which are operated by controls 9 are coupled to the input device 27 by line 28. The controls 9 are coupled to the input/output device 27 by line 26. The optical elements 29 of indicator 11 are coupled to the input/output device by line 31. Operation of the control elements 9 and 10 generate data at a data port 32 of the input/output device 27 which data establishes predetermined interconnections within the electrical control apparatus. The data generated at data port 32 by the controls 9 and 10 establish logic connections in the microprocessor 33 which provide a predetermined control loop contained in a control program. Data generated at the data port 32 of the input/output device 27 is stored in the memory 34 which retains storage when power is removed. Illustration of the arrangement for indicating the actual value of a process parameter is omitted.

The electrical control apparatus operates as follows. During normal operation, the movable panel is hinged closed and the apparatus operated in its normal (manual or automatic) control mode. Controls 9 are operable via the push buttons 15 and 16. In the automatic control mode of operation, the control function is automatically set by the apparatus and the actual value of a process parameter being monitored or controlled is displayed by indicator 7 in cooperation with scale 8 while a set value of the process parameter is displayed by indicator 4 in cooperation with scale 5. The set value displayed by indicator 4 can be increased or decreased incrementally by operation of the push buttons 15 and 16. Additionally, control functions being carried out by the apparatus can be set manually utilizing push buttons 18 and 19 if the electrical control apparatus is in a manual control mode. As mentioned, the state of a switch (not shown) determines whether the apparatus is an automatic or manual control mode.

When control parameters such as control constants are to be set, the movable panel is hinged to its open configuration thereby releasing the double-throw switch 13. The control elements 10 are thereby conditioned to select a particular control parameter displayed by indicator 11 in cooperation with scale 23. At the same time, the controls 9 are conditioned to select a desired or set value of the selected control parameter which value is displayed in cooperation with scale 20. Indicator 7 continues to display the selected process parameter and is unaffected by switch 13.

The particular apparatus structure can be selected in the open configuration of the movable panel when the double-throw switch 14 is actuated. Upon actuating the double-throw switch 14, a predetermined structural configuration can be selected by operation of control elements 10 as displayed by indicator 11 in cooperation with scale 24. Some substructural configurations can also be selected by operating the controls 9 while the double-throw switch 14 is actuated with a substructural configuration being displayed by indicator 4 in conjunction with scale 21.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. In a control apparatus including a control panel and a movable panel which can be moved to overlay or expose at least a portion of the control panel, two indicators disposed on the control panel, control means disposed on the control panel, switch means for conditioning the apparatus to operate in first and second modes and processor means for controlling operations of the apparatus, each indicator indicating a different parameter in the first and the second modes, and the control means being operative in each mode to affect the parameters corresponding to said mode and to affect the indication thereof by the respective indicators, the improvement comprising the switch means being associated with the control panel and the movable panel such that the switch means automatically conditions the apparatus to operate in the first mode while preventing operation of the apparatus in the second mode when the movable panel exposes said portion of the control panel and automatically conditions the apparatus to operate in the second mode while preventing operation of the apparatus in the first mode when the movable panel overlays said portion of the control panel, said control means comprising a first control associated with a first of the two indicators and a second control associated with a second of the two indicators, input-output means responsive to the switch means for coupling the first indicator, the first control and the processor means in the first and second modes so that the first indicator indicates a different parameter in each mode and the first control affects the parameters corresponding to the respective modes and the indication thereof on the first indicator, and for coupling the second indicator, the second control and the processor means in the first and second modes so that the second indicator indicates a different parameter in each mode and the second control affects the parameters corresponding to the respective modes and the indication thereof on the second indicator, a scale on the control panel and a scale on the movable panel associated with the first indicator and a scale on the control panel and a scale on the movable panel associated with the second indicator, the scales on the control panel being overlayed by the movable panel when the movable panel overlays said portion of the control panel.

2. The apparatus according to claim 1 wherein the scales on the control panel are disposed adjacent to a respective indicator, the movable panel includes two apertures therein and the scales on the movable panel are disposed adjacent to the respective aperture such that the first and second indicators are exposed and the scales on the control panel are overlayed when the movable panel overlays said portion of the control panel.

3. The apparatus according to claim 1 wherein the movable panel includes means thereon for actuating the first control when the movable panel overlays said portion of the control panel.

4. The apparatus according to claim 1 wherein the movable panel includes means for actuating the second control when the movable panel overlays said portion of the control panel.

5. The apparatus according to claim 1 and including further switch means disposed on the control panel for conditioning the apparatus to operate in a third mode, the movable panel overlaying said further switch means and preventing access thereto when the movable panel overlays said portion of the control panel, a further scale being disposed on said control panel adjacent said second indicator, said input-output means coupling said second indicator, said second control and said processor for operation of the apparatus in said third mode when said further switch means are activated, the second indicator indicating still another type of parameter and the second control being operative to affect the still another type of parameter and to affect the indication thereof by the second indicator in the third mode.

* * * * *